No. 787,939. PATENTED APR. 25, 1905.
R. OLIVER.
SHOCKING MACHINE.
APPLICATION FILED NOV. 9, 1903.

Witnesses: Robert Oliver Inventor

By Marion&Marion

Attorneys

No. 787,939. PATENTED APR. 25, 1905.
R. OLIVER.
SHOCKING MACHINE.
APPLICATION FILED NOV. 9, 1903.

Witnesses:
Robert Oliver, Inventor
By Marion & Marion
Attorneys

No. 787,939. Patented April 25, 1905.

UNITED STATES PATENT OFFICE.

ROBERT OLIVER, OF PORTAGE LA PRAIRIE, CANADA, ASSIGNOR OF ONE-HALF TO DAVID HEWITSON, OF PORTAGE LA PRAIRIE, CANADA.

SHOCKING-MACHINE.

SPECIFICATION forming part of Letters Patent No. 787,939, dated April 25, 1905.

Application filed November 9, 1903. Serial No. 180,291.

*To all whom it may concern:*

Be it known that I, ROBERT OLIVER, a subject of the King of Great Britain, residing at Portage la Prairie, in the county of Portage la Prairie, in the Province of Manitoba, Canada, have invented certain new and useful Improvements in Shocking-Machines; and I do hereby declare that the following is a full, clear, and exact description of the invention, such as will enable others skilled in the art to which it appertains to make and use the same.

My invention relates to harvesters, and concerns itself especially with a shocking or stooking attachment to be used in connection with implements of this kind.

The invention contemplates an arrangement whereby the sheaves of grain will be received from the binder-deck and disposed together in substantially the form of a shock or stook. These sheaves are received, of course, one at a time and accumulate in the shocking attachment until a complete shock is formed. When a complete shock has been formed in the manner suggested, the mechanism operates to set the shock upon the ground.

The object of the invention is to produce mechanism for the purpose described which is very simple in construction and substantially automatic in operation.

In its general construction the invention comprises a frame which may constitute an extension of the usual framework of the binder, and upon this frame there are mounted a plurality of forks which project radially from a central shaft and rotate therewith.

A cradle is provided adapted to receive the sheaves one by one from the binder-deck, and this cradle is mounted upon an arm which elevates each sheaf automatically from time to time, so as to place the same upon one of the aforesaid forks. An intermittent movement is imparted to the shaft carrying the forks for the purpose of bringing the forks successively into coöperation with the moving cradle. This operation continues until all the forks have received sheaves, and after this takes place the forks are operated automatically so as to allow the collection of sheaves to be deposited upon the ground. The shock is formed near the rear of the frame, so that depositing the shock upon the ground does not interfere with the advance of the implement. In this connection it may be stated that a difficulty arises in placing the sheaves upon the forks by means of a cradle in the manner suggested, for the reason that the cradle receives the sheaves in such a position or relation which would operate to place the sheaves upside down upon the forks—that is, with the heads of the grain downward. This obstacle is overcome by mechanism which revolves the cradle during its ascent.

The cradle and its arm normally occupy a depressed and substantially horizontal position near the bottom of the shocker-frame, and arrangement is made for normally locking the arm in this relation. When a sheaf falls upon the cradle, however, it operates automatically to release the arm and simultaneously actuates a clutch, which is normally inoperative, in such a manner as to impart the necessary movement to the cradle and its arm and to impart also an intermittent movement to the forks.

It should be stated that all the mechanism of this shocking attachment is driven from some moving part of the harvester mechanism, the movement of the shocking mechanism being transmitted through the clutch referred to above, which clutch is automatically controlled.

The shock-former, which includes the forks already referred to, constitutes an important feature of my invention, and in its construction it includes a cone or apron within which the shaft carrying the forks is centrally disposed. The handles of the forks are disposed radially about the shaft, as suggested, and lie behind the lateral surface of the said cone, their tines projecting upwardly and outwardly around the lower edge of the cone. The tines normally occupy a position such as that suggested, extending beyond the cone; but when the shock has been completely set up about the cone an automatically-operated trip actuates the handles of the forks in such a manner as to draw them inwardly, so as to free the sheaves from the tines, whereupon the sheaves all fall together to the ground under the cone and constitute a finished shock.

The invention consists in the construction and combination of parts to be more fully described hereinafter, and definitely set forth in the claims.

In the drawings, which fully illustrate my invention, Fig. 9 is a side elevation of a cam-wheel or tripwheel which is used for the purpose of releasing the shock.

Throughout the drawings and specification the same numerals of reference denote like parts.

Referring more particularly to the parts, 1 represents the framework of the harvester, which may be of any common construction, such as that shown, and in this framework there is mounted, as usual, a main wheel 2, upon the axle whereof a main sprocket-wheel 3 is attached, the same affording opportunity for driving a counter-shaft or arbor 4 by means of a chain 5. The shaft 4 affords means for driving the disk crank 6 by means of a suitable shaft 7 through the medium of the bevel-gears 8, and this same shaft 4 also operates to drive a stub-shaft 9 by means of an auxiliary sprocket-wheel 10 and sprocket-chain 11. The counter-shaft 4 may comprise a clutch 12 of any suitable construction, enabling the harvesting mechanism to be thrown out of connection when desired. The crank-disk 6 affords means for actuating the mower-bar of the harvester in any usual manner.

Upon the rear extremity of the shaft 7 there is mounted a sprocket-wheel 13, with which a chain 14 coöperates, which chain affords means for actuating the binder mechanism 15 through the medium of a shaft 16 and chain 16ª, and this chain 14 also operates the mechanism of an elevator 17, which elevator advances the grain in the usual manner to the inclined binder-deck 18.

At the right of the framework 1 of the harvester with respect to the direction in which the implement advances the shocking attachment is arranged. It comprises a frame 19, the forward portion whereof is of substantially rectangular form, as indicated, and at the rear the frame is formed into a yoke 20, as shown. This frame is preferably mounted upon wheels 21. As indicated, the body or forward portion of the frame 19 is formed of parallel beams 22 and 23, between which and adjacent to the inner beam 22 there is arranged a third beam 24. At the rear, in the space between the beams 22 and 24, there is mounted a clutch 25, the same comprising a central shaft 26, which substantially alines with the aforesaid stub-shaft 9 and connects therewith through universal joints 27, as shown. The construction involving universal joints is considered desirable in view of the unevenness of the ground over which the implement must pass, which unevenness would disturb the correct alinement between the shafts 9 and 26.

The construction and mode of operation of the clutch 25 will be described more fully hereinafter. It is sufficient for our present purposes to state at this point that this clutch enables all the mechanism of the shocking attachment to be actuated and that this clutch is entirely automatic in its operation, being closed or open, as desired. It should be stated, however, that the clutch comprises a sprocket-wheel 28, coöperating with a chain 29 to drive a sprocket-wheel 30, located near the forward portion of the frame 19 and between the beams 22 and 24, as shown, the said sprocket-wheel 30 being rigidly attached to an arbor 31, upon the outer extremity whereof a gear-wheel 32 is rigidly mounted. This gear-wheel 32 meshes with a gear-wheel 33, this latter gear being attached rigidly to the extremity of a shaft 34, which is mounted in the forward portion of the frame and extends transversely thereof, operating, through the medium of bevel-gears 35, to drive a vertical shaft 36. This vertical shaft is rotatably mounted in a tubular member 37, disposed at the forward portion of the frame and constituting a part of a superstructure 38, mounted upon the said frame. At the rear of the frame and at the enlargement 20 thereof an arch 39 is attached, which constitutes a portion of a superstructure 38 to support an upper beam 40. This beam 40 is substantially centrally disposed above the frame 19 and at its rear supports the shock-former 41, and this shock-former is actuated by means of a shaft 42, suitably mounted in bearings 43 upon the upper side of the beam 40, as shown. The shaft 42 is driven by the shaft 36 aforesaid through the medium of the bevel-gears 44. The beam 40 may be offset downwardly, as indicated at 40ª, so as to accommodate a cam-wheel 45, carried by the shaft 42, the purpose of which will appear more fully hereinafter. Just above the shock-former, to the upper side of the beam 40, there is attached a bracket 46, preferably of the form shown, and a collar 47 is disposed beneath this bracket, as shown. A similar collar 48 is provided at the under side of the beam 40. Within these collars is rigidly attached a tubular guide or shaft 49, which is rotatably mounted in and extends vertically downward below the beam 40, as shown, and just below the collar 48 a collar 50 is rigidly attached to this shaft 49, which collar constitutes the hub of a spider 51, (shown most clearly in Fig. 8,) which spider comprises a circumferential rim or band 52, and to this rim is attached the upper edge of a cone or apron 53, which cone constitutes the body of the shock-former. The construction of this cone will be more fully described hereinafter. It is sufficient for our present purposes to state that it is preferably formed of sheet metal and is adapted to house within it a plurality of fork-handles 54, disposed just behind the wall of the same, as shown. These fork-handles are pivotally attached at their upper extremities to a ring 55, which is fixed to the aforesaid spider 51, and at their lower extremities forks 56 are attached to the fork-handles, the said forks preferably comprising three tines 57, which are disposed in such a manner that they normally project upwardly and outwardly from beneath the lower edge of the cone.

Figure 5:
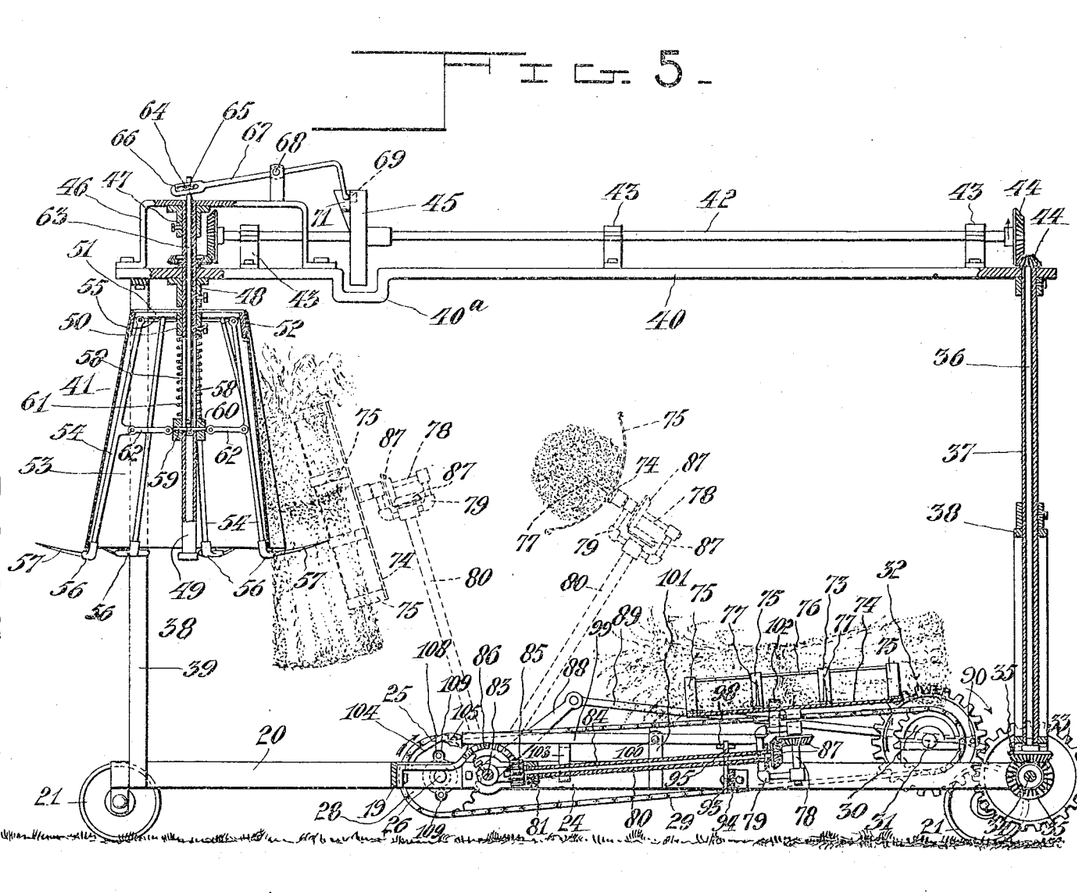
Fig. 5 is substantially a vertical central section through the shocking attachment, some parts being in elevation.
Figure 6:
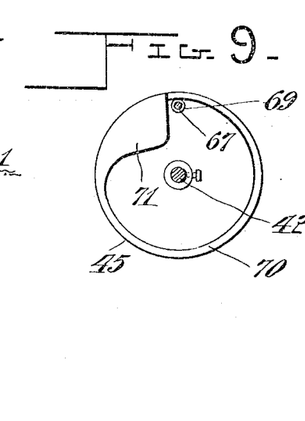

It should be stated at this point that the shaft 42 affords means for intermittently rotating the shock-former 41 so as to bring the forks 56 successively into position to receive the sheaves from the cradle, which has been briefly referred to above. Arrangement is made for drawing the forks inwardly when the forming of the shock has progressed to the proper stage. For this purpose a portion of the tubular shaft 49 beneath the spider 51 is provided with a pair of oppositely-disposed longitudinal slots 58, and through these slots a pin 59 passes, the same being mounted in a runner 60, which runner consists simply of a collar surrounding the tubular shaft and adapted to slide thereupon. This runner is normally maintained in its most depressed position by means of a helical spring 61, disposed around the tubular shaft and thrusting against the hub of the spider 51, as indicated. This runner 60 connects, by means of links 62, with substantially the middle portion of the fork-handles 54, and these links are of such length that when the runner occupies its most depressed position the handles will be held in their most outward position, as represented in Fig. 5.

In order to withdraw the forks from the bundles, the runner 60 is drawn upwardly from time to time, the mechanism for this purpose including a stem 63, mounted in the shaft 49, and to the upper extremity whereof there is attached a loose collar 64, the said collar having oppositely-projecting pins 65, as shown. These pins are received in slots 66, formed in the bifurcated extremity of a trip-lever 67, the same having a fulcrum at 68 and carrying a roller 69, coöperating with the aforesaid cam-wheel 45. The cam-wheel 45 (represented in Fig. 9) consists of a disk with a flange 70, upon the inner face whereof a roller 69 runs, and this flange is formed with an irregularity or shoulder 71, which operates once in every revolution of the cam to depress the adjacent extremity of the lever 67, in this manner imparting a vertical movement to the stem 63. By reason of the vertical movement of the stem 63 the links 62, attached to the runner 60, move upwardly, and this of course operates to draw the handles of the forks inwardly, as will be readily understood.

Figure 8:
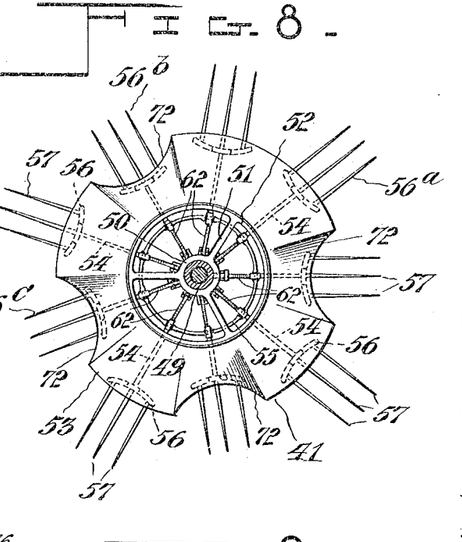
Fig. 8 is a horizontal section taken just above the shock-former and representing the shock-former substantially in plan.

The forks 56 are preferably nine in number, the same being arranged so that five of these nine forks are substantially alike and project to a greater distance than the remaining four, as shown in Fig. 8. These nine forks are arranged at an equal angular distance apart, the angle between two consecutive forks being forty degrees. It should be stated that in placing the sheaves upon the forks the sheaves are not placed successively upon consecutive forks, but upon alternate forks. Hence the amount of rotation of the shock-former to receive each successive sheaf is eighty degrees. Thus, supposing the fork 56ª to be the first to receive a sheaf, the next fork to receive a sheaf would be that indicated by the numeral 56ᵇ, and the next fork would be 56ᶜ, and so on, so that it would require exactly two complete revolutions of the shock-former in order to place sheaves on all the forks.

While the apron 53 is of substantially conical form, its lateral surface is formed with depressions 72, adapted to receive the bodies of the sheaves carried by the most inwardly disposed forks.

Near the lower edge of the binder-deck 18 and at a point adapted to receive the sheaves as they pass from the same a cradle 73 is provided, which cradle preferably consists of a body having a back 74, with transverse bands or ribs 75, which curve upwardly toward their extremities and are secured by tie-rods 76 at their extremities, as shown, in such manner as to form a basket or cradle. This cradle is normally disposed with its axis substantially parallel with the lower edge of the binder-deck, so as to receive a sheaf as it falls from the deck. At substantially the center line of this cradle upwardly-projecting spurs 77 are provided, the same being for a purpose which will appear more fully hereinafter. Projecting downwardly from the under side of the cradle there is a short spindle 78, which is rigid with the cradle and rotatably mounted in a bifurcated head 79, which head is rigidly attached to a tubular arm 80, and the opposite extremity of this arm attaches to a foot 81, which is rigidly mounted upon stub-shafts 82 and 83. Within the tubular arm 80 there is mounted a spindle 84, which projects near the foot 81, at which point it carries rigidly a pinion 85, and the teeth of this pinion engage with the teeth of a segment 86, which segment is disposed about the axis of the stub-shafts 82 and 83 as a center. Bevel-gears 87, disposed at the head 79, afford means for rotating the cradle by reason of the spindle 84, and it should be understood that the function of the segment 86 is to coöperate with the pinion 85 in order to produce such a rotation of the cradle as that described.

It should be understood that as a sheaf falls upon the cradle from the binder-deck it will be disposed in the position indicated in Fig. 5 with the heads of the grain disposed toward the shock-former, and it should be further understood that the arm 80 is actuated by mechanism, to be described later, in such a manner as to raise the cradle for the purpose of depositing the sheaf carried thereby upon that fork of the shock-former which is presented to receive it. However, as it is necessary that the sheaves when disposed about the cone of the shock-former should assume substantially the position which they will have upon the ground it is necessary to rotate the cradle through one hundred and eighty degrees to bring about this result. For this reason the segment 86 is employed in connection with the pinion 85 and other parts described.

For the purpose of actuating the foot 81 the stub-shaft 83 is provided with a rigid arm 88, which arm is actuated from time to time by a pitman 89, the said pitman being itself actuated by a crank-pin 90, attached to the side of the aforesaid gear 32. In Fig. 5 the arm 80, in connection with the cradle, is represented in dotted lines in two positions, showing different stages in the process of raising a sheaf to place the same upon a fork.

It should be understood that the continued rotation of the gear-wheel 32 operates to return the cradle-arm 80 to its normal depressed position, and in order to equalize the necessary forces in raising or returning the cradle a helical spring 91 is employed, the same being attached to a short arm 92, which is rigidly attached to the stub-shaft 82. This short arm 92 is substantially oppositely placed with respect to the arm 88, so that the spring operates to assist the upward motion of the cradle. For the same reason the spring operates to resist the return of the cradle, in this way equalizing the forces in the two movements of the arm. The forward extremity of the spring 91 may be attached in a suitable eyebolt 93, the same being secured to the beam 23 of the frame.

At a point near the head 79 a catch 93 is provided, the same being pivoted to a transverse member 94, connecting the beams 23 and 24. This catch consists simply of a lever, the inner arm whereof is formed into a hook 95, which may overhang the arm 80 in such a manner as to retain the same in its depressed position against the force of the spring 91, which normally constrains the arm toward an erect position, as will be readily understood. The hook 95 is provided with an inclined upper edge 96, which enables the descending arm to throw the catch 93 to one side, as will be readily understood. The catch, however, is normally constrained into a position such as will retain the arm by a spring 97, which spring thrusts against an upwardly-offset arm 98 of the catch, which arm is disposed oppositely to the hook 95.

Arrangement is made for releasing the arm 80 automatically from the catch 93 when the sheaf falls upon the cradle. For this purpose a releasing-lever 99 is provided, the same having its fulcrum at 100 upon a standard 101, attached to the beam 24, and this releasing-lever is provided with a lateral extension 102, which projects upwardly between the ribs of the cradle 73 at substantially the middle point thereof, as shown. From this arrangement it should readily appear that when a sheaf falls upon the cradle the extension 102 will be depressed, and this will have the effect of depressing also the outer arm 98 of the catch 93, which will release the arm 80, as will be readily understood.

The releasing-lever 99 has another function in connection with the aforesaid clutch 25, and the manner in which it coöperates with the clutch will now be described; but before proceeding to a description of the clutch and the specific manner in which the releasing-lever 99 coöperates therewith it should be stated that this releasing-lever constitutes the means for controlling this clutch, the condition of the clutch being dependent solely upon the position of the said releasing-lever. The rear extremity of the releasing-lever 99 is supported upon a fixed stop 103, the same being fixed to the beam 24 in any suitable manner.

Figures 3, 6, 7:
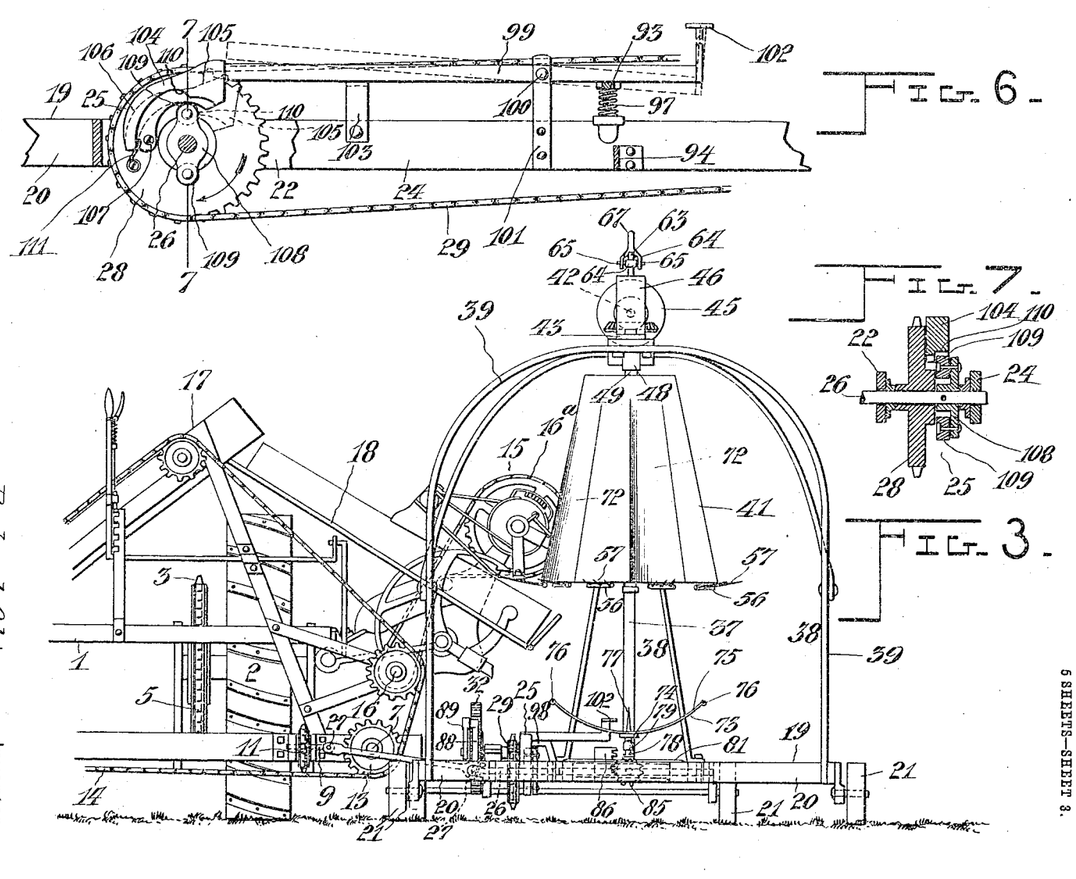
Fig. 3 is a rear elevation of the attachment, showing the contiguous parts of the binder and other contiguous mechanism of the harvester.
Fig. 6 is a section supposed to be taken substantially on the line 6 6 of Fig. 1, this view being upon an enlarged scale, as will appear, and certain parts being represented as broken away.
Fig. 7 is a section supposed to be taken substantially upon the line 7 7 of Fig. 6.
Figure 4:
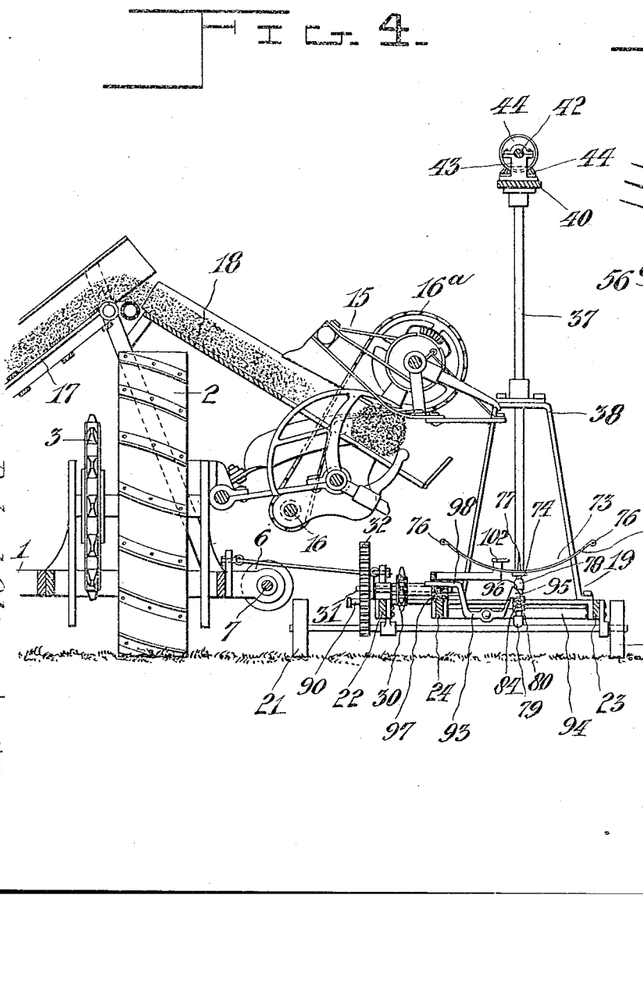
Fig. 4 is a transverse section passing through the shocking attachment and the binder-deck.

Upon the face of the sprocket-wheel 28, which has already been described, there is attached a dog 104, which dog is preferably of substantially the form shown, having an enlarged driving-head 105 and a tail 106, which is pivoted at 107 upon the shaft 26, which has also been described. There is rigidly attached a hub 108, which hub is rotated continuously and carries a pair of oppositely-disposed rollers 109, which project to a small extent beyond the hub, as shown. That face of the dog 104 which is disposed toward the hub 108 is formed with a curved recess presenting a shoulder 110, and the dog is constrained by a spring 111, which tends to throw this shoulder inwardly and into the path of the rollers 109. When one of the rollers 109 is in engagement with the recess or shoulder 110, it should be understood that the dog 104 is driven forwardly in the direction of rotation of the shaft 26, and the relation then assumed by the parts constitutes the closed position for the clutch. The position of the dog when the clutch is in its closed relation is represented in dotted outline in Fig. 6; but it should be understood that the clutch is normally in an open position. In other words, the dog 104 is normally held back or away from engagement with the rollers 109. It is one of the functions of the releasing-lever 99 to hold this dog out of engagement with the rollers in the manner set forth. For this reason a laterally-projecting extension of the releasing-lever 99 normally lies in the path of this dog 104, normally abutting against the forward face of the driving-head 105 of the dog. From this arrangement it should appear that though the clutch is normally open and transmitting no movement to the shocking mechanism the falling of a sheaf into the cradle instantly actuates the releasing-lever 99 so as to close the clutch 25 and also releases the arm 80, whereupon the sheaf is raised upon the cradle and deposited upon one of the forks 56.

The mode of operation of the mechanism will be now briefly reviewed. Continuous rotation is imparted to the shaft 26 through the universal connections 27, driven by the main sprocket-wheel 3. Upon the shaft 26 there is a clutch 25, which clutch is normally in an open condition, so that no motion is transmitted therethrough to the mechanism of the shocker. This clutch is normally maintained in this open condition by a releasing-lever 99, the extremity whereof coöperates with a dog 104, which is an integral part of the clutch, maintaining the same out of engagement with the member which drives it. The extremity of this releasing-lever opposite to that which coöperates with the clutch is disposed near the cradle 73, which cradle is adapted to receive each sheaf as it comes from the binder-deck. The falling of a sheaf upon the cradle depresses the adjacent part of the releasing-lever and closes the clutch 25. The cradle 73, which is carried upon an arm normally held in a depressed position by a catch 93, is automatically released by this same releasing-lever 99, there being a contact between the releasing-lever and the catch 93. The raising of the arm 80, which carries the cradle, operates to rotate the cradle by reason of a segment 86, which coöperates with a pinion, which pinion drives the cradle. Coöperating with the arm 80 and the cradle 73 the shock-former, which comprises a plurality of forks 56, presents one of these forks in such a position that it may receive a sheaf from the cradle, whereupon the arm returns the cradle to its normal depressed position. In order to place sheaves upon all of the forks, the shock-former is rotated whenever the clutch is closed, so as to present the alternate forks successively to receive sheaves from the cradle.

As hereinbefore stated, for the purpose of actuating the foot 81, carrying arm 80, the stub-shaft 83 is provided with a rigid arm 88, which arm is actuated from time to time by the pitman 89, the pitman being actuated by the crank-pin 90, attached to the side of the gear 32. This gear meshes with gear 33, to which is attached bevel-gear 35 on shaft 37, which shaft at its opposite end carries bevel-gear 44, which actuates shaft 42, and this shaft is the means employed to actuate and rotate the shock-former. Each time the cradle is actuated the shaft 42 will be partly rotated through the medium of the mechanism just described, the gears being so arranged and proportioned that the shock-former will be rotated to successively present alternate forks.

Figures 1, 10:
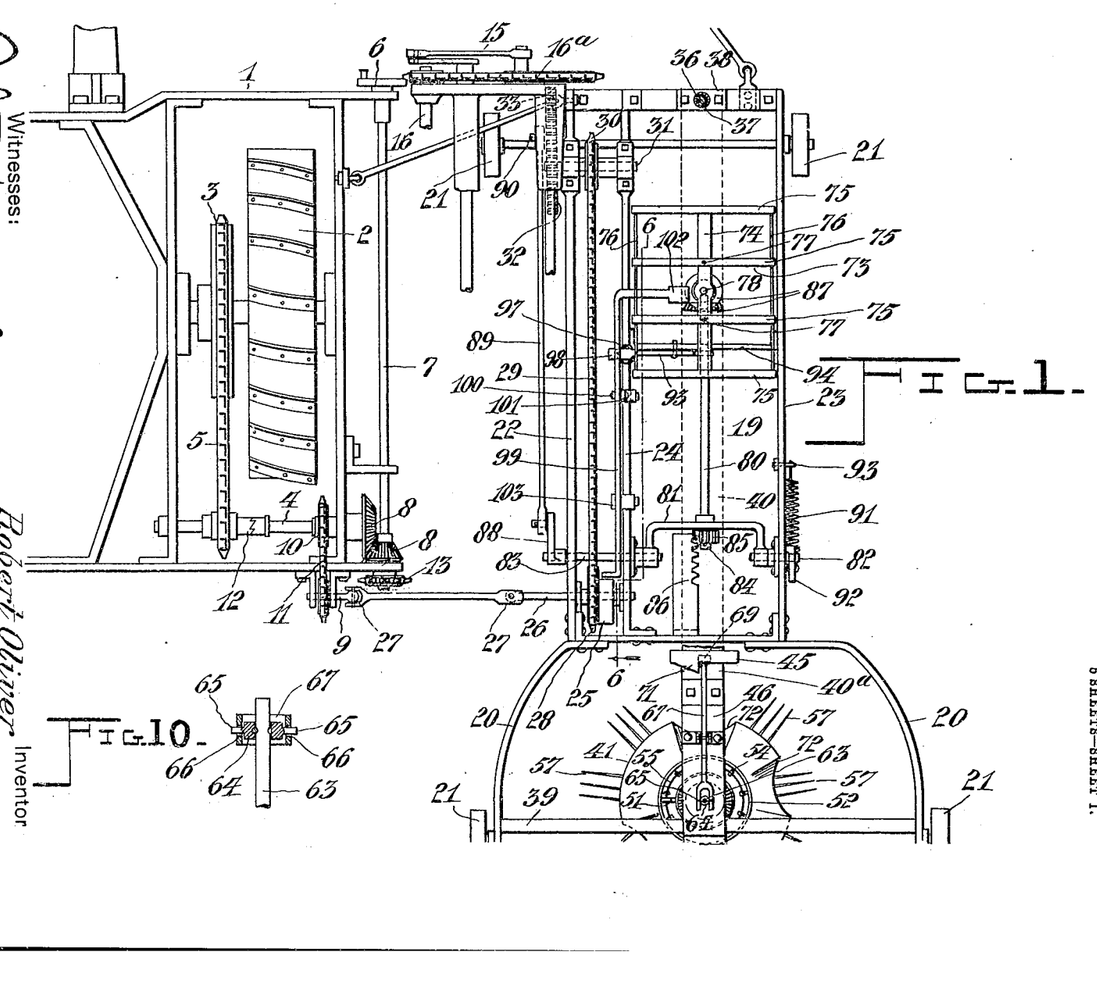
Figure 1 is a plan representing a portion of the framework of a harvester to which my invention has been attached, certain parts being broken away, as will appear.
Fig. 10 is a central vertical section taken at right angles to the direction in which the implement advances and passing through the upper portion of the shock-releasing stem.
Figure 2:
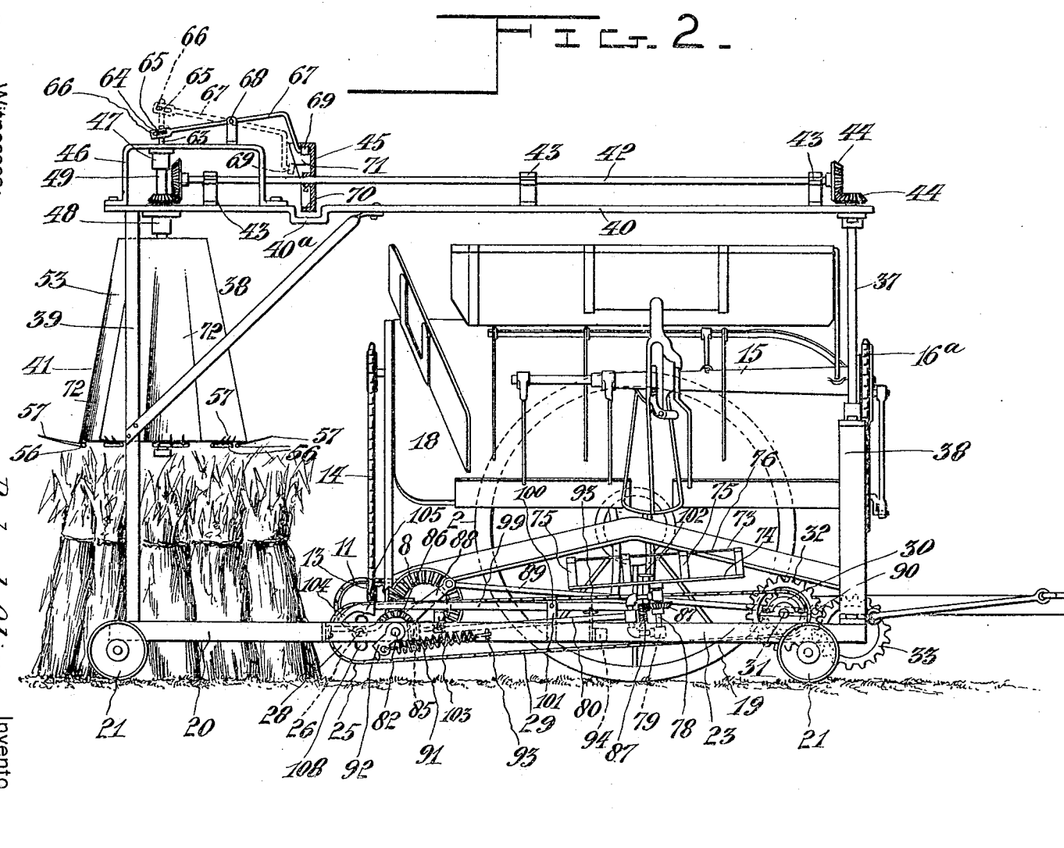
Fig. 2 is a side elevation of the harvester with the shocking attachment, a part of the actuating mechanism being shown in section, as will appear.

When the shaft 42 has been partly rotated a sufficient number of times to nearly complete a single rotation of the cam-wheel 45, carried thereby, the shoulder 71 of the cam-wheel begins to engage the roller 69 of the lever 67, and the last movement to complete a single rotation of the cam-wheel depresses the lever to the position shown in dotted lines in Fig. 2, whereby the forks will be withdrawn from the sheaves by the mechanism already described, and the shock will then drop to the ground.

The body of the shock-former consists of a substantially conical member beneath the edge of which the forks project, and from time to time when the shock-former shall have been filled with sheaves the forks 56 are drawn inwardly beneath the cone by means of a centrally-disposed stem attached to the runner 60, the said stem being automatically actuated through the medium of the cam-wheel 45 and the lever 67. In this manner complete shocks are formed about the cone 53 and automatically dumped or deposited upon the ground as soon as the shock is complete, as indicated in Fig. 2.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim as new, and desire to secure by Letters Patent, is—

1. In an implement of the class described, in combination, a rotatable member having a substantially vertical axis, means for supporting a plurality of sheaves about said member, and automatic means for releasing said sheaves, comprising a lever connecting with said supporting means and a cam-wheel arranged to actuate the lever.

2. In an implement of the class described, in combination, a rotatable member having a substantially vertical axis, means for automatically imparting a rotary movement to said member, means for supporting a plurality of sheaves disposed about the periphery of said member, and automatic means for releasing said sheaves and forming a shock, comprising a lever connecting with said supporting means and a cam-wheel arranged to actuate the lever.

3. In an implement of the class described, in combination, a substantially conical member, means carried thereby for supporting a plurality of sheaves against the outer wall thereof, said member being in an elevated position, and automatic means for releasing said sheaves whereby they may fall below said conical member to form a shock thereunder, said releasing means comprising a lever connecting with said supporting means and a cam-wheel arranged to actuate the lever.

4. In an implement of the class described, in combination, a rotatable body, members carried thereby and projecting therefrom, said members being adapted to receive sheaves to support the same, and automatic means for withdrawing said members to release said sheaves and form a shock, comprising a lever connecting with said projecting members and a cam-wheel arranged to actuate said lever.

5. In an implement of the class described, in combination, a rotatable member, forks carried thereby and adapted to support sheaves thereabout, means for placing sheaves upon said forks, and means for rotating said member to present said forks successively to said last means.

6. In an implement of the class described, in combination, a rotatable member, forks carried thereby and adapted to receive sheaves, means for intermittently rotating said member, a cradle adapted to receive sheaves, and means for actuating said cradle to deposit sheaves upon said forks.

7. In an implement of the class described, in combination, a body presenting a lateral surface disposed in a general vertical direction, forks projecting outwardly beyond said lateral surface, means for depositing sheaves upon said forks, and means for withdrawing said forks inwardly to release said sheaves.

8. In an implement of the class described, a plurality of forks disposed about a substantially central axis, said forks being adapted to receive sheaves thereupon, means in conjunction with said forks against which said sheaves may rest, means for depositing sheaves upon said forks, and automatic means for withdrawing said forks to release said sheaves.

9. In an implement of the class described, in combination, a plurality of forks disposed about a substantially central axis, means for intermittently rotating said forks about said axis, means for depositing sheaves successively upon said forks, and automatic means for withdrawing said forks from said sheaves.

10. In an implement of the class described, in combination, a member constituting the body of a shock-former, arms pivotally mounted therein, forks carried by said arms and projecting outwardly from said body, a movable member within said body, links connecting said arms with said movable member, means for rotating said body, and means for actuating said movable member.

11. In an implement of the class described, a shock-former comprising, in combination, a body, a substantially central shaft therein, a ring, a plurality of arms carried by said ring, forks attached to said arms and projecting laterally from said body, a runner longitudinally movable upon said shaft, links attached to said runner and said arms, means for rotating said body, and means for moving said runner longitudinally upon said shaft.

12. In an implement of the class described, a shock-former comprising, in combination, a body, a plurality of forks having handles pivoted to said body, said forks projecting laterally beyond said body, a movable member disposed within said body, means for constraining the same into an extreme position, links connecting said movable member with said handles, and automatic means for actuating said movable member.

13. In an implement of the class described, a member constituting the body of a shock-former, a shaft constituting a substantially central axis for said body and rotating therewith, a stem disposed longitudinally with respect to said shaft, a runner movably mounted upon said shaft, forks having pivotally-mounted handles, links connecting said runner with said handles, and means for actuating said stem to move said runner.

14. In an implement of the class described, in combination, a member constituting a body for a shock-former, a centrally-disposed tubular shaft rotating with said body and having a longitudinally-disposed slot therein, a runner guided upon said shaft, a pin carried by the runner, a stem mounted within said shaft and adapted to strike the pin and actuate said runner, a spring constraining said runner, forks having handles, links connecting said runner with said handles, means for rotating said body, and means for actuating said stem.

15. In an implement of the class described, a substantially vertical shaft, a cone disposed thereabout, a ring within said cone, a plurality of handles pivotally carried by said ring, forks attached to said handles, a runner movably mounted upon said shaft, means for constraining said runner toward an extreme position, links connecting said runner with said handles, means for rotating said cone, a cam rotating coincidently with said cone, and means for actuating said runner by said cam.

16. In an implement of the class described, in combination, a circumferentially-disposed member, forks projecting outwardly therefrom, handles carrying said forks, mechanism for simultaneously actuating said forks to draw the same inwardly, automatic means for controlling said mechanism, and means for rotating said member.

17. In an implement of the class described, in combination, a cradle adapted to receive the sheaves from a binder-deck, a shock-former, comprising a cone-shaped, vertically-disposed member and retaining members radially projecting therefrom and means for actuating said cradle to present in upright position a sheaf carried thereby to said shock-former.

18. In an implement of the class described, in combination, a cradle adapted to receive a sheaf from a binder-deck, a shock-former, comprising a cone-shaped, vertically-disposed member and retaining members radially projecting therefrom, mechanism for actuating said cradle to present a sheaf in upright position upon the retaining members, mechanism for actuating said shock-former to coöperate with said cradle, and automatic means for controlling said mechanism.

19. In an implement of the class described, in combination, a cradle adapted to receive a sheaf from a binder-deck, a shock-former, comprising a cone-shaped, vertically-disposed member and retaining members radially projecting therefrom, means for actuating said cradle to present sheaves in upright position to said retaining members, mechanism for actuating said shock-former to coöperate with said cradle, a clutch through which said last means are driven, and automatic means for controlling said clutch.

20. In an implement of the class described, in combination, a cradle adapted to receive a sheaf from a binder-deck, a shock-former, comprising a cone-shaped, vertically-disposed member and retaining members radially projecting therefrom, an arm carrying said cradle, and means for actuating said arm to present in upright position a sheaf carried by said cradle to said shock-former.

21. In an implement of the class described, in combination, a shock-former comprising a cone-shaped, vertically-disposed member and retaining members projecting radially therefrom adapted to support a plurality of sheaves, a cradle adapted to receive sheaves one by one from a binder-deck, an arm carrying said cradle, means for actuating said arm to present in upright position a sheaf carried by said cradle to said shock-former, and means for intermittently rotating said shock-former.

22. In an implement of the class described, in combination, a cradle adapted to receive a sheaf from a binder-deck, a shock-former disposed rearwardly of said cradle with respect to the direction of advance of said implement, said shock-former being adapted to support a plurality of sheaves in a substantially upright position, means for actuating said cradle to present a sheaf carried thereby to said shock-former, means for rotating said cradle, a lever arranged to release sheaves from said supporting member and a cam-wheel arranged to actuate said lever.

23. In an implement of the class described, in combination, a cradle adapted to receive a sheaf from a binder-deck, said cradle having a substantially centrally disposed spindle constituting an axis of rotation therefor, a shock-former, an arm carrying said cradle and comprising a rotatable shaft, means for actuating said arm to present a sheaf carried by said cradle to said shock-former, and means for rotating said shaft when said arm moves.

24. In an implement of the class described, in combination, a cradle adapted to receive a sheaf from a binder-deck, said cradle having an axis of rotation, an arm carrying said cradle, a shaft carried by said arm and adapted to rotate said cradle, a pinion carried by said shaft, a segment coöperating with said pinion, a shock-former, and means for actuating said arm to present a sheaf carried by said cradle to said shock-former.

25. In an implement of the class described, in combination, a cradle adapted to receive a sheaf from a binder-deck, a tubular arm carrying said cradle and having a head, a spindle carried by said cradle and rotatably mounted in said head, a shaft carried in said tubular arm, gear-wheels carried by said shaft and said spindle, a pinion carried by said shaft, a segment coöperating with said pinion, a shock-former, and means for actuating said arm to present a sheaf carried by said cradle to said shock-former.

26. In an implement of the class described, in combination, a shock-former, comprising a cone-shaped, vertically-disposed member and retaining members projecting radially therefrom, a cradle adapted to receive a sheaf from a binder-deck, means for actuating said cradle to present a sheaf carried thereby to said shock-former, a clutch through which said shock-former and said last means are actuated, a lever controlling said clutch, said lever being actuated by the falling of the sheaf upon said cradle, and means for automatically actuating said retaining members to release the sheaves from the shock-former.

27. In an implement of the class described, in combination, a shock-former, a cradle adapted to receive a sheaf from a binder-deck, an arm carrying said cradle, means for actuating said arm to present a sheaf carried by said cradle to said shock-former, a catch adapted to lock said arm normally in a depressed position, and a lever adjacent to said cradle adapted to release said catch.

28. In an implement of the class described, in combination, a shock-former, a cradle, an arm carrying said cradle, mechanism for actuating said arm to present a sheaf carried by said cradle to said shock-former, a clutch through which said mechanism and said shock-former may be actuated, means for locking said arm normally in a depressed position, and automatic means for simultaneously controlling said clutch and releasing said arm.

29. In an implement of the class described, a shock-former, a cradle adapted to present sheaves received from the binder-deck to said shock-former, a clutch, mechanism for driving said shock-former and said cradle through said clutch, said clutch including a driving-dog, and a lever projecting into the path of said dog and lying adjacent to said cradle.

30. In an implement of the class described, in combination, a shock-former, comprising a vertically-disposed, cone-shaped member and retaining members radially projecting therefrom, a moving cradle coöperating therewith and adapted to receive a sheaf from a binder-deck, mechanism for actuating said shock-former to present its successive faces to the cradle and mechanism actuating said cradle to present sheaves in upright position to said retaining members, a clutch including a driving member, a driving-dog, a spring constraining said driving-dog to maintain said clutch in a closed relation, and a lever which may project into the path of said dog, said lever lying adjacent to said cradle and adapted to be operated by a sheaf falling thereon.

31. In an implement of the class described, in combination, a shock-former, comprising a vertically-disposed, cone-shaped member and radially-disposed retaining members projecting therefrom, a moving cradle coöperating therewith to present sheaves thereto in upright position, mechanism for driving said shock-former and said cradle, a clutch through which said mechanism is driven comprising a continuously-moving driving member, a roller carried thereby, a driven member, a driving-dog carried thereby, means for constraining said driving-dog into the path of said roller to maintain said clutch in a closed relation, a lever which may project into the path of said dog and lying adjacent to said cradle to be struck by a sheaf falling thereupon, and a spring constraining said lever.

32. In an implement of the class described, in combination, a shock-former, a vertically-disposed, cone-shaped member and retaining members radially projecting therefrom, a cradle adapted to receive a sheaf from the binder-deck, an arm carrying said cradle, means for actuating said arm to present a sheaf in upright position to each of said retaining members to coöperate with said shock-former, said arm normally occupying a depressed position, and means for constraining said arm toward an erect position.

33. In an implement of the class described, in combination, a shock-former, comprising a cone-shaped, vertically-disposed member and members projecting radially therefrom, a cradle adapted to receive a sheaf from the binder-deck, an arm carrying said cradle and coöperating with said shock-former, said cradle being constructed and arranged to present a sheaf in upright position to said retaining members, and a spring constraining said arm toward an erect position.

34. In an implement of the class described, in combination, a shock-former, a cradle adapted to receive a sheaf from a binder-deck, an arm carrying said cradle and coöperating with said shock-former, said arm normally occupying a depressed position, a second arm rigid with said first arm, and a spring attached to said second arm and constraining said first arm toward an erect position.

35. In an implement of the class described, a shock-former comprising a plurality of forks disposed about an axis, said forks being arranged in sets disposed at different distances from said axis, adjacent forks being generally in different sets, a cradle adapted to receive a sheaf from a binder-deck, an arm carrying said cradle, means for actuating said arm to present a sheaf carried by said cradle to said shock-former, and means for intermittently rotating said shock-former to present alternate forks carried thereby to receive said sheaf.

36. In an implement of the class described, in combination, a shock-former, a cradle coöperating therewith and adapted to receive a sheaf from a binder-deck, said cradle having a spur adapted to impale a sheaf received by said cradle.

37. In an implement of the class described, a substantially rectangular frame disposed longitudinally in the direction in which said implement advances, said frame being adjacent to the edge of the binder-deck of said implement, an arm having a foot rotatably mounted in said frame and normally occupying a depressed position, said foot being disposed toward the rear of said implement, a cradle carried by the forward extremity of said arm and adapted to receive a sheaf from said binder-deck, and a rotatable shock-former disposed rearwardly of said arm and coöperating with said cradle.

38. In an implement of the class described, in combination, a member having a substantially vertical axis and constituting the body for a shock-former, a centrally-disposed tubular shaft rigid therewith, a driving-shaft, gears connecting said driving-shaft with said vertical shaft and adapted to rotate said member, forks carried within said member and adapted to receive sheaves, a vertically-disposed stem carried within said vertical shaft, mechanism connecting said stem with said forks for operating the same, a lever adapted to actuate said stem, and a cam carried by said driving-shaft to actuate said lever.

39. In an implement of the class described, in combination, a frame, a superstructure carried thereby, a rotatable shock-former supported by said superstructure at the rear of said frame, a shaft carried by said superstructure and adapted to actuate said shock-former, an arm having a foot pivotally attached in said frame and normally occupying a depressed position, a cradle carried by said arm and adapted to receive a sheaf from the binder-deck, means for actuating said arm to present a sheaf carried by said cradle to said shock-former, and means for driving said shaft.

In witness whereof I have hereunto set my hand in the presence of two witnesses.

ROBERT OLIVER.

Witnesses:
 E. A. McPHERSON,
 HORACE ORMOND.